(12) United States Patent
Vasseur et al.

(10) Patent No.: US 7,623,461 B2
(45) Date of Patent: Nov. 24, 2009

(54) TRIGGER FOR PACKING PATH COMPUTATION REQUESTS

(75) Inventors: Jean Philippe Vasseur, Dunstable, MA (US); Carol Iturralde, Framingham, MA (US); Robert Goguen, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 591 days.

(21) Appl. No.: 11/054,145

(22) Filed: Feb. 9, 2005

(65) Prior Publication Data

US 2006/0176828 A1    Aug. 10, 2006

(51) Int. Cl.
G01R 31/08    (2006.01)
(52) U.S. Cl. .................... 370/238; 370/395.41; 370/468
(58) Field of Classification Search .................... None
See application file for complete search history.

(56) References Cited

U.S. PATENT DOCUMENTS

| | | | |
|---|---|---|---|
| 5,088,032 A | | 2/1992 | Bosack |
| 6,026,077 A | * | 2/2000 | Iwata ........................ 370/254 |
| 6,122,753 A | * | 9/2000 | Masuo et al. .................. 714/4 |
| 6,351,770 B1 | | 2/2002 | Li et al. |
| 6,539,427 B1 | | 3/2003 | Natarajan et al. |
| 6,577,597 B1 | | 6/2003 | Natarajan et al. |
| 6,584,502 B1 | | 6/2003 | Natarajan et al. |
| 6,665,273 B1 | | 12/2003 | Goguen et al. |
| 6,778,492 B2 | | 8/2004 | Charny et al. |
| 6,822,940 B1 | | 11/2004 | Zavalkovsky et al. |
| 6,950,432 B2 | * | 9/2005 | Chen et al. ................... 370/390 |
| 7,362,774 B2 | * | 4/2008 | De Clercq et al. ........... 370/466 |
| 2002/0067693 A1 | | 6/2002 | Kodialam et al. |
| 2003/0169685 A1 | | 9/2003 | Luss et al. |
| 2003/0208602 A1 | | 11/2003 | Bhalla et al. |
| 2004/0004938 A1 | * | 1/2004 | Buddhikot et al. .......... 370/238 |

(Continued)

OTHER PUBLICATIONS

"Notification of Transmittal of the International Search Report and the Written Opinion of the International Searching Authority, or the Declaration" for International Serial No. PCT/US06/03224 with an International Filing Date of Jan. 30, 2006.

(Continued)

*Primary Examiner*—Phirin Sam
(74) *Attorney, Agent, or Firm*—Cesari and McKenna, LLP (57) ABSTRACT

A technique triggers packing of path computation requests (PCRs) for traffic engineering (TE) label switched paths (LSPs) that are sent from one or more label-switched routers (LSRs) to a path computation element (PCE) of a computer network. According to the novel technique, incoming PCRs are packed into sets in response to a certain event, and one or more TE-LSPs (paths) are computed for each PCR of a particular set based on the PCRs of that set. Specifically, the PCE detects an event in the network ("network event") indicating that an increase in the number of incoming PCRs has occurred, or that an increase is likely to occur due to, e.g., a change in a network element. Once the network event has been detected, the PCE packs the incoming PCRs into configured-length sets, such as, e.g., for a specified time interval or a certain number of PCRs. The PCE computes paths for each PCR of a particular set while considering the other PCRs of that set, thereby reducing race conditions, signaling overhead, and set-up failures.

25 Claims, 5 Drawing Sheets

U.S. PATENT DOCUMENTS

| | | | |
|---|---|---|---|
| 2004/0042406 A1 | 3/2004 | Wu et al. | |
| 2004/0193724 A1* | 9/2004 | Dziong et al. | 709/232 |
| 2004/0218525 A1* | 11/2004 | Elie-Dit-Cosaque et al. | 370/223 |
| 2004/0233850 A1 | 11/2004 | Randriamasy et al. | |
| 2005/0008014 A1* | 1/2005 | Mitra et al. | 370/392 |
| 2005/0025179 A1 | 2/2005 | McLaggan et al. | |
| 2005/0111465 A1* | 5/2005 | Stewart | 370/400 |
| 2005/0276217 A1* | 12/2005 | Gadgil et al. | 370/225 |
| 2006/0098587 A1* | 5/2006 | Vasseur et al. | 370/254 |
| 2006/0176820 A1* | 8/2006 | Vasseur et al. | 370/241 |

OTHER PUBLICATIONS

Rekhter, Y., RFC 1771, entitled A Border Gateway Protocol 4 (BGP-4), Mar. 1995, pp. 1-54.

U.S. Appl. No. 10/767,574, filed Sep. 18, 2003, Vasseur et al., entitled Computing Inter-Autonomous System MPLS Traffic Engineering LSP Paths.

U.S. Appl. No. 11/052,280, filed Feb. 7, 2005, Vasseur et al., entitled Inter-Domain Optimization Trigger in PCE-Based Environment.

Vasseur, J. P., et al., Network Working Group Internet Draft, entitled RSVP Path Computation Request and Reply Messages (draft-vasseur-mpls-computation-rsvp-05.txt), Jul. 2004, pp. 1-31.

Callon, R., RFC 1195, entitled Use of OSI ISIS for routing in TCP/IP and Dual Environments, Dec. 1990, pp. 1-80.

Rekhter, Y., RFC 1771, entitled a Border Gateway Protocol 4 (BGP-4), Mar. 1995, pp. 1-28.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Berger, L., RFC 3473, entitled Generalized Multi-Protocol Label Switching (GMPLS) Signaling Resource ReserVation Protocol-Traffic Engineering (RSVP-TE) Extensions, Jan. 2003, pp. 1-40.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999, Section 12.2.4, pp. 317-319.

\* cited by examiner

TRIGGER FOR PACKING PATH COMPUTATION REQUESTS

BACKGROUND OF THE INVENTION

1. Field of the Invention

The present invention relates to computer networks and more particularly to triggering the packing of path computation requests that are sent to path computation elements of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled RSVP-TE: *Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their domain, and thus may be used for more optimal path computation. A head-end LSR may further operate as a path computation client (PCC) configured to send a path computation request (PCR) to the PCE, and receive a response with the computed path, which potentially takes into consideration other path computation requests from other PCCs. It is important to note that when one PCE sends a request to another PCE, it acts as a PCC. PCEs conventionally have limited or no visibility outside of its surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). An example of such a distributed PCE architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

In some circumstances, more than one PCR that may benefit from the use of the same resources will be received substantially simultaneously at a PCE. Due to a limited amount of network resources, however, the LSRs sending the PCRs may be forced to "race" for the resources. This is particularly the case where path computation is performed serially, i.e., path computation is performed on each request separately in the order in which it was received. For example, if two LSRs each request 1 MB (megabyte) of bandwidth over the same link with 1 MB of available bandwidth, the first LSR to complete the required TE-LSP reservation signaling reserves its desired resources, while the TE-LSP for the second LSR fails. This situation commonly occurs with a PCE that "double books" resources, namely, allocating the same available resource for multiple PCRs (such as, e.g., a "stateless" PCE not configured to store responses to PCRs served in the past). For instance, in the example above, the first LSR sends the first PCR, and the PCE subsequently computes a first path that is replied to the first LSR. Next, the second LSR sends the second PCR, and the PCE subsequently computes a second path that utilizes the same resources as the first path, which notably are not yet reserved by the first LSR at the time of the PCE computation. The first LSR then reserves the resources for the first path, and when the second LSR attempts to reserve the resources for the second path (through signaling), the set-up of the second path fails. The second LSR must then resend its PCR in order to obtain a different path for its desired TE-LSP.

Multiple substantially simultaneous PCRs may occur at any time throughout a network, but are particularly prevalent during and/or after an event that affects network topology, such as requests to reroute a TE-LSP that has been affected by the failure of a link. Also, many LSRs may be configured with optimization triggers that request optimization (or re-optimization) of a TE-LSP upon the detection of certain events, such as the restoration of a link, or a sizeable increase in available bandwidth over a particular link. An example of an inter-domain optimization trigger is described in commonly-owned copending U.S. patent application Ser. No. 11/052,280, entitled INTER-DOMAIN OPTIMIZATION TRIGGER IN PCE-BASED ENVIRONMENT, filed by Vasseur et al., on Feb. 7, 2005, the contents of which are hereby incorporated by reference in its entirety. Notably, in current networks, such as where many TE-LSPs use the same network elements (e.g., border routers), the number of PCRs requesting a rerouted TE-LSP upon the detection of an event (e.g., failure of the border router) may be very large (e.g., hundreds or thousands), causing many race conditions between the competing PCRs. The increased race conditions may significantly increase signaling overhead from set-up failures, while also increasing the rerouting times for the TE-LSPs whose set-ups have failed.

SUMMARY OF THE INVENTION

The present invention is directed to a technique for triggering packing of path computation requests (PCRS) for traffic engineering (TE) label switched paths (LSPs) that are sent from one or more label-switched routers (LSRs) to a path computation element (PCE) of a computer network. According to the novel technique, incoming PCRs are packed into sets in response to a certain event, and one or more TE-LSPs (paths) are computed for each PCR of a particular set based on the PCRs of that set. Specifically, the PCE detects an event in the network ("network event") indicating that an increase in the number of incoming PCRs has occurred, or that an increase is likely to occur due to, e.g., a change in a network element. Once the network event has been detected, the PCE triggers a "packing algorithm," which packs the incoming PCRs into configured-length sets, such as, e.g., for a specified time interval or a certain number of PCRs. As part of the packing algorithm, the PCE computes paths for each PCR of a particular set while considering the other PCRs of that set in a correlated (i.e., non-serialized) manner, thereby reducing race conditions, signaling overhead, and set-up failures.

In accordance with one aspect of the present invention, the PCE detects the network event by detecting an increase in the number of incoming PCRS. The PCE monitors the average rate at which it receives PCRs (e.g., during steady state), and compares this average rate to the latest monitored rate (new rate) for a configurable increase. This increase may be calculated as either a predefined number of PCRs above the average rate, a certain percentage above the average rate, or a derivative function (rate of change) of the average rate rising above a particular threshold.

In accordance with another aspect of the present invention, the PCE detects the network event by detecting certain changes in the network topology. Generally, the changes are those that indicate the potential for an increase in the rate at which the PCE receives PCRs, such as events causing a large number of LSRs to request new/reoptimized TE-LSPs at once. Such network events typically include a failure or restoration of a network element (e.g., a node or link), or a configurable increase in available bandwidth over a link.

In accordance with still another aspect of the present invention, once triggered by the event, the PCE packs the incoming PCRs into configured-length sets, such as, e.g., for a specified time interval, or a certain number of PCRs. The PCE then computes paths for each PCR of a particular set while considering the other PCRs of that set. Upon computing the paths, the PCE responds to LSRs sending the PCRs with the computed paths for the set. Notably, the PCE may notify the LSRs that their requests have been packed with other PCRs, in which case the LSRs may desire to send subsequent PCRs (e.g., for re-optimization of the resultant TE-LSPs) sooner than if they had not been packed. The PCE packs the incoming PCRs into sets for a configurable period of time and repeats the packing algorithm as necessary.

Advantageously, the novel technique packs PCRs received at a PCE based on a network event that indicates an increase in the rate at which the PCE receives the PCRS. By packing the PCRs into sets for path computation in response to the event, the inventive technique provides a mechanism for efficiently reducing race conditions, signaling overhead, and set-up failures generally caused by a sudden increase of PCRs.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
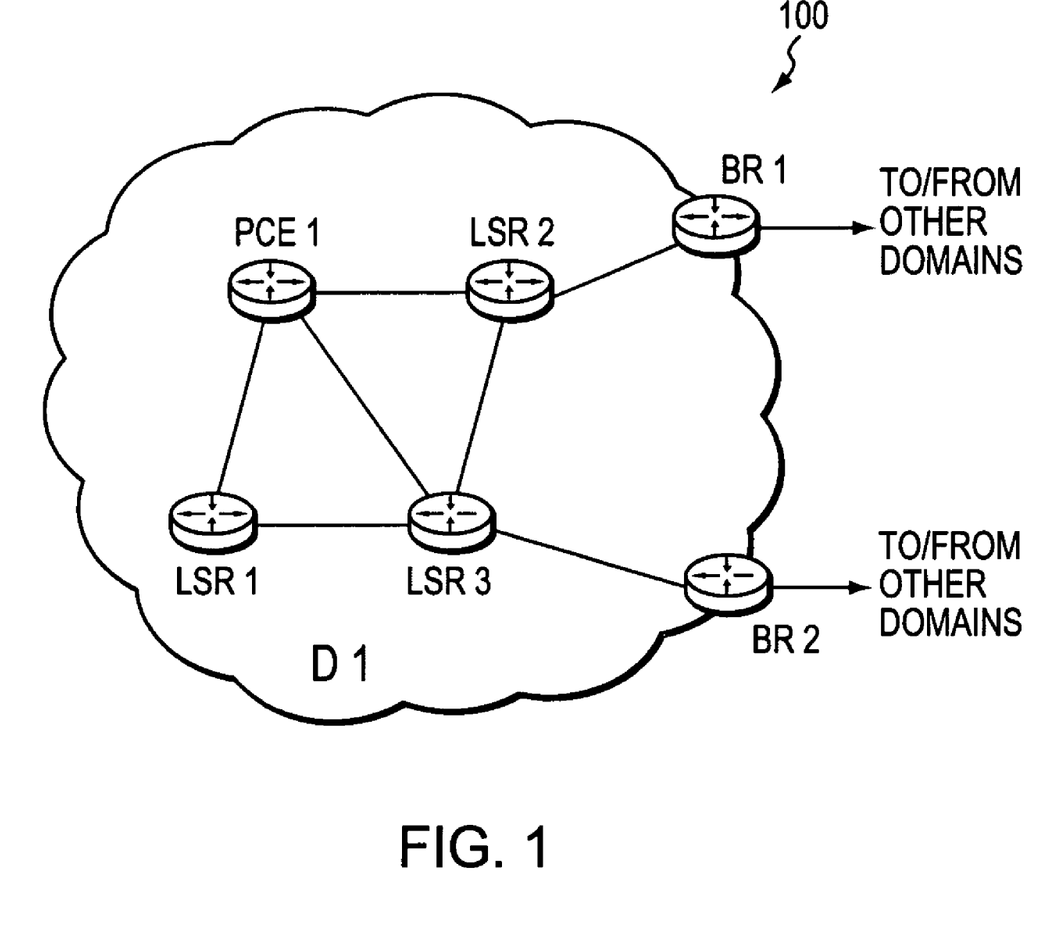
FIG. 1 is a schematic block diagram of an exemplary computer network that may be used in accordance with the present invention.

FIG. 1 is a schematic block diagram of an exemplary computer network 100 comprising domain D1. Domain D1 has exemplary border routers BR1 and BR2 connected to other domains (not shown), and also has exemplary intradomain routers LSR1, LSR2, LSR3, and PCE1, the latter of which is configured to operate as a PCE for the domain in accordance with the present invention described herein. As used herein, a domain may be configured as an area or an autonomous system (AS). An area is a collection of routers that share full network topology information with each other but not necessarily with routers outside the area. The border routers BR1-2 in an area are embodied as area border routers (ABRs), which are shared with adjacent areas (not shown). The term area as used herein also encompasses the term "level" which has a similar meaning for networks that employ IS-IS as their interior gateway protocol (IGP), in which case the border routers BR1-2 are embodied as level 1/level 2 (L1L2) routers (also shared with adjacent levels). A collection of areas or levels may be contained within a single AS. In an AS, the border routers BR1-2 are embodied as AS border routers (ASBRs), which are in communication with other ASBRs from other ASes (not shown). These examples are merely representative. Those skilled in the art will understand that any number of routers and nodes may be used in the domain, that any number of domains may be present in network 100, and that the view shown herein is for simplicity. Those skilled in the art will also understand that many network configurations of routers and domains may benefit from the teachings of the present invention described herein, and that FIG. 1 is merely a representative model of a network configuration. For instance, border routers BR1 and/or BR2 may be configured as PCEs for inter-domain Traffic Engineering capabilities.

Data packets may be exchanged among the routers of domain D1 and other domains using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the domain using predetermined IGPs, such as conventional distance-vector protocols or, illustratively, link-state protocols, through the use of IGP Advertisements.

Figure 2:
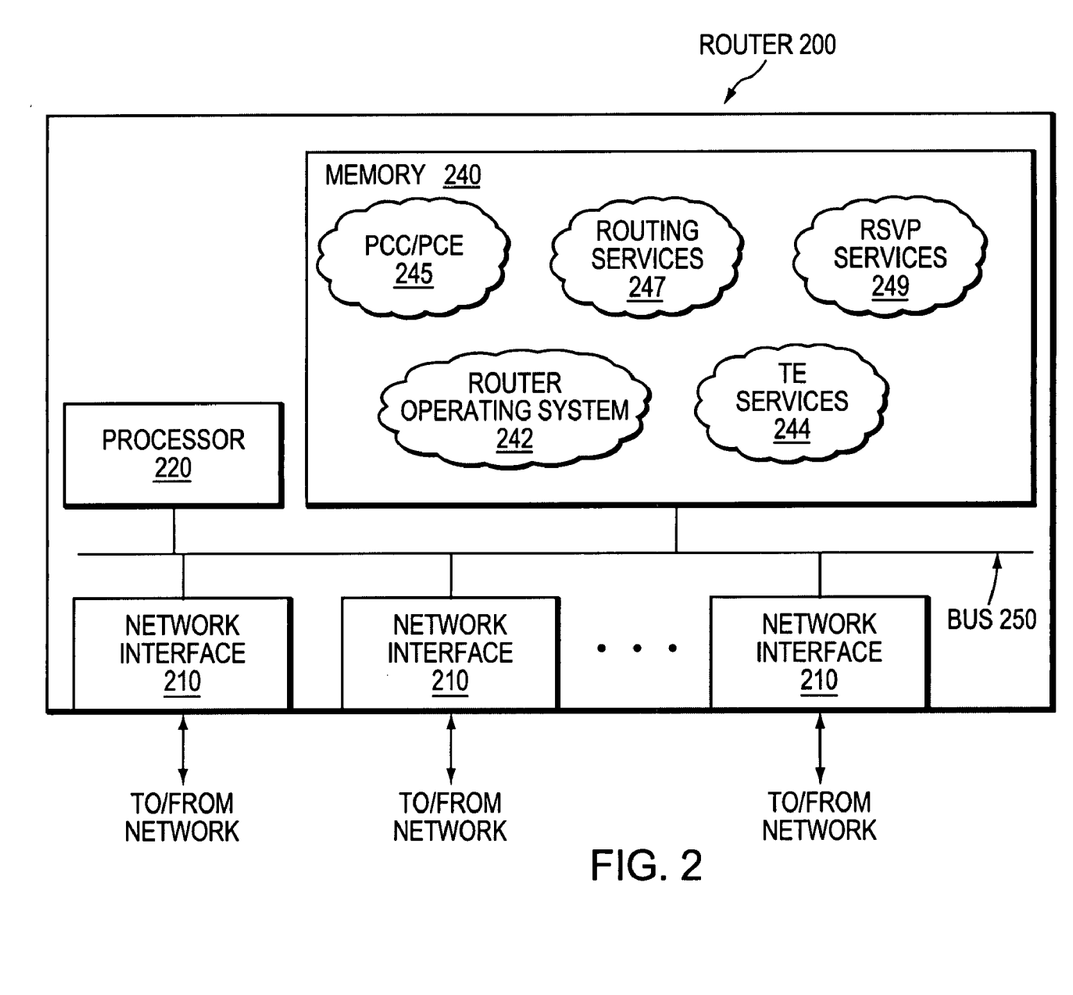
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. A router operating system 242, portions of which are typically resident in memory 240 and executed by the processor, functionally organizes the router by, inter alia, invoking network operations in support of software processes and/or services executing on the router. These software processes and/or services include PCC/PCE process 245, routing services 247, TE services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP, e.g. OSPF and IS-IS. These functions may be configured to manage a forwarding information database (not shown) containing, e.g., data used to make forwarding decisions. TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

Changes in the network topology may be communicated among routers 200 using a link-state protocol, such as the conventional OSPF and IS-IS protocols. Suppose, for example, that a communication link fails within an AS or a cost value associated with a network node changes. Once the change in the network's state is detected by one of the routers, that router may flood an IGP Advertisement communicating the change to the other routers in the AS. In this manner, each of the routers eventually "converges" to an identical view of the network topology.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed s bandwidth under certain conditions. Illustratively, the TE-LSPs may be signaled through the use of the RSVP protocol, and in particular, RSVP TE signaling messages.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The path computation request (and response) between PCC and PCE can be exchanged in accordance with a protocol specified in Vasseur, et al. *RSVP Path Computation Request and Reply Messages (draft-vasseur-mpls-computation-rsvp-05.txt)*, Internet Draft, July 2004, which is hereby incorporated by reference as though fully set forth herein. It should be understood that the use of RSVP serves only as an example, and that other communication protocols may be used in accordance with the present invention.

The present invention is directed to a technique for triggering packing of path computation requests (PCRs) for traffic engineering (TE) label switched paths (LSPs) that are sent from one or more label-switched routers (LSRs) to a path computation element (PCE) of a computer network. According to the novel technique, incoming PCRs are packed into sets in response to a certain event, and one or more TE-LSPs (paths) are computed for each PCR of a particular set based on the PCRs of that set. Specifically, the PCE detects an event in the network ("network event") indicating that an increase in the number of incoming PCRs has occurred, or that an increase is likely to occur due to, e.g., a change in a network element. Once the network event has been detected, the PCE triggers a "packing algorithm," which packs the incoming PCRs into configured-length sets, such as, e.g., for a specified time interval or a certain number of PCRs. As part of the packing algorithm, the PCE computes paths for each PCR of a particular set while considering the other PCRs of that set in a correlated (i.e., non-serialized) manner, thereby reducing race conditions, signaling overhead, and set-up failures.

In accordance with one aspect of the present invention, the PCE detects the network event by detecting an increase in the number of incoming PCRS. The PCE monitors the average rate at which it receives PCRs (e.g., during steady state), and compares this average rate to the latest monitored rate (new rate) for a configurable increase. Generally, at steady state, the PCE receives PCRs on a substantially regular basis, such as new requests for desired TE-LSPs or timed re-optimization (e.g., once every hour, day, or week) of existing TE-LSPs. Notably, while the average rate for a particular network at steady state is usually stable, those skilled in the art will understand that the average rate may vary between networks (e.g., networks with standard data traffic may re-optimize TE-LSPs once every 6 months, while other networks with voice or sensitive data may re-optimize TE-LSPs once every 5 minutes). As an example, assume that PCE1 receives PCRs from LSR1-3 at an average rate of 1 PCR per minute in steady state.

Notably, the average rate may be calculated using a known simple average function, or a low-pass filter function to limit the effect of standard network oscillations. For example, in the low-pass filter function, a higher weight or multiplier is applied to the previous average rate than to the new average rate, such that:

$$\text{Average\_Rate} = (X * \text{Old\_Rate}) + (Y * \text{New\_Rate})$$

Example values for X and Y may be 0.9 (for 90% Old_Rate) and 0.1 (for 10% New_Rate). Those skilled in the art will understand that other values for X and Y may be used in the low-pass filter function, and that those values are within the scope of the present invention. Also, the new rate may be calculated for any configurable amount of time, such as the average rate for the past 5 seconds (aggressive), or 5 hours (less aggressive), etc. Furthermore, any other technique known to those skilled in the art may be used to compute the Average_Rate, and such techniques are within the scope of the present invention.

The configurable increase may be calculated as either a predefined number of PCRs above the average rate, a certain percentage above the average rate, or a derivative function (rate of change) of the average rate rising above a particular threshold. Illustratively, the predefined number is configurable and may vary based on the network. For example, if PCE1 receives an average of 1 PCR per minute, an exemplary predefined number may be an increase of 10 PCRs per minute. An increase (burst) would therefore be detected if PCE1 calculated a new rate of 11 PCRs per minute. However, in a network where the PCE receives an average of 500 PCRs per minute, it may not be desirable to trigger the packing algorithm if the rate increases to 510 PCRs per minute, so a different value would be more preferable (e.g., 100 PCRs per minute increase).

Instead of using a predefined number, a PCE may be configured to determine if the new rate is a certain percentage above the average rate. Notably, depending upon the network, the percentage may be configured as any percentage above 0% (e.g., an increase of 30%), including any percentage greater than 100% (e.g., an increase of 200%). For instance, if PCE1 is receiving PCRs at a rate of 10 per minute and is configured to trigger the packing algorithm at a 50% increase, the packing algorithm will be triggered once the new rate of PCRs reaches 15 per minute (assuming the old rate remains at 10 per minute).

Known methods may be used to compute the derivative function (rate of change, or slope) of the average rate of PCRs received by the PCE. The actual rate of change that triggers the PCR packing algorithm is configurable as either a predefined number (e.g., a rate of change of 2) or as a percentage over the last rate of change calculated (e.g., 10% greater than the previous computed rate of change). For example, in steady state, the rate of change for the rate at which the PCE receives PCRs should be close to zero (no change, hence steady state). If configured to detect a slope of 2, the packing algorithm triggers when the rate at which the PCE receives PCRs has doubled since the last computation (e.g., from 20 PCRs per minute to 40 PCRs per minute).

Those skilled in the art will understand that the sensitivity of each of the above techniques depends on the time between computations. For example, assume that the rate in the exemplary derivative function reached 60 PCRs per minute during the last 5 minutes of the past hour. The total new average rate for the last hour, however, may not have reached 40 PCRs per minute (double the previous rate of 20) if, for example, the remaining minutes of the hour had still received 20 PCRs per minute. This would result in a new average rate for the entire hour of only 23.3 PCRs per minute, and the PCE will not trigger the packing algorithm. On the other hand, if the computations are made every 30 seconds, clearly the PCE would detect an event within the first 30 seconds of the 5 minute interval at 60 PCRs per minute. Those skilled in the art will also understand that the increase depends on the previously computed average rate in each of the above techniques. For instance (such as in the 50% percent increase scenario above), if the old rate increased from 10 to 12 per minute over time, an increase (burst) would be detected at 18 PCRs per minute, not at 15.

In accordance with another aspect of the present invention, the PCE detects the network event by detecting certain changes in the network topology. Generally, the changes are those that indicate the potential for an increase in the rate at which the PCE receives PCRs, such as events causing a large number of LSRs to request new/reoptimized TE-LSPs at once. Such network events typically include a failure or restoration of a network element (e.g., a node or link), or a configurable increase in available bandwidth over a link. By detecting a change in topology of the network in this manner, the PCE anticipates a potential "burst" or sharp increase of incoming PCRs. For example, should PCE1 learn that a node or link within the network has failed, e.g., BR1 or the link between LSR2 and LSR3, PCE1 may be configured to trigger the packing algorithm expecting a sharp increase in received PCRs for TE-LSPs that have failed due to the lost node or link. Illustratively, the PCE learns of the network event through conventional notification means, e.g., an IGP Advertisement, or through other notification means. Examples of other notification means that may be used with the present invention are described in above-incorporated U.S. patent application Ser. No. 11/052,380, entitled INTER-DOMAIN OPTIMIZATION TRIGGER IN PCE-BASED ENVIRONMENT. Those skilled in the art will understand that the network change-based trigger may be complimentary to the above-described PCR rate increase detection. Particularly, a PCE may not be able to detect all possible events that would cause an increase in the PCR rate, such as certain inter-domain changes (e.g., where a PCE has no inter-domain routing adjacency). Also, some rate increases are not caused by a particular network event, such as unrelated simultaneous requests from multiple LSRs for new TE-LSPs.

In accordance with still another aspect of the present invention, once triggered by the event, the PCE packs the incoming PCRs into configured-length sets, such as, e.g., for a time interval (e.g., every 5 seconds) as specified by a set timer, or a certain number of PCRs (e.g., every 10 PCRs) as specified by a set counter. The PCE computes paths for each PCR of a particular set (e.g., the 10 PCRs) while considering the other PCRs of that set. Path computation is performed using any known path computation technique, such as, e.g., CSPF. Notably, by computing paths for a set of PCRs at the same time (in a correlated fashion), the PCE is able to allocate network resources in a more efficient manner than had it computed paths on the PCRs serially (in an uncorrelated fashion, i.e., as they arrived separately). Computing PCRs in a correlated fashion may also avoid the allocation of the same resource to multiple PCRs, thus reducing the risk of TE-LSP set-up failure.

Figure 3A:
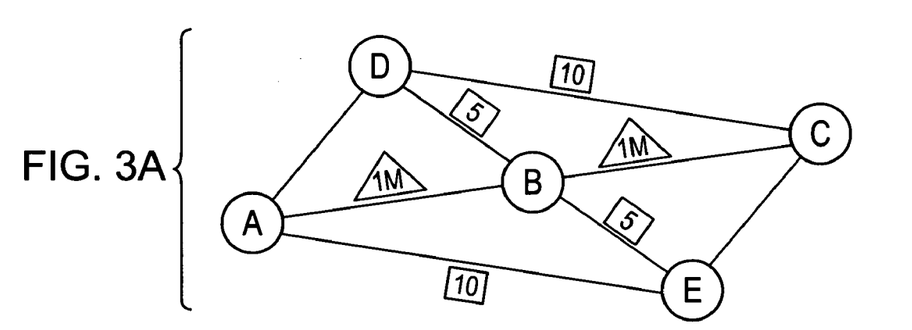
FIG. 3A is a schematic block diagram of an exemplary network of nodes that may be used in accordance with the present invention.

As an example, FIG. 3A is a schematic block diagram of an exemplary network of nodes that may be used in accordance with the present invention. Nodes A-E are in communication with each other over links as shown. Assume that each link has a cost value of 1 and an available bandwidth of 2.5 GB (Gigabytes), unless otherwise noted. Particularly, links A-E and D-C have costs (in boxes) of 10, links D-B and B-E have costs of 5, and links A-B and B-C have an available bandwidth (in triangles) of 1 MB. Suppose, for illustration, that a PCE (not shown) receives two PCRs originated from node A. (Notably, the PCRs may have been received from outside the network, and the network shown may be a representative portion of a larger network. The network shown is merely a representative example.) For simplicity, the first and second PCRs each request a TE-LSP that has a bandwidth of 1MB and extends from node A to node C.

Figure 3B:
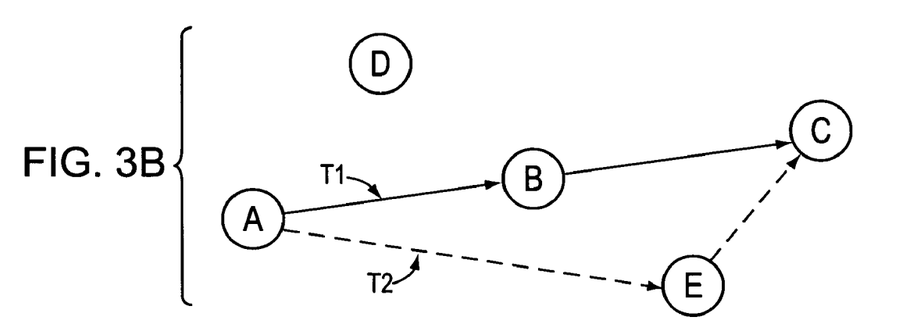
FIG. 3B is a schematic block diagram of exemplary paths computed in a serialized fashion.

FIG. 3B is a schematic block diagram of exemplary paths computed in a serialized fashion. Here, in the serialized, uncorrelated computation, the first PCR is received by the PCE, which then computes the shortest path that meets the constraints of the request. The resulting TE-LSP, T1, traverses the shortest path available, namely from node A, to node B, to node C (a cost of 2). Yet once this new TE-LSP T1 is established (i.e., through signaling), the bandwidth on the links A-B and B-C is no longer available. Now assume that the second PCR is received by the PCE shortly thereafter. When the PCE computes the shortest path available that meets the constraints of the request (i.e., it can no longer use links A-B or B-C, known as "pruning" those links), the resulting TE-LSP, T2, traverses node A, to node E, to node C (a cost of 11). Also, had the second PCR further constrained the request to a cost of less than 10, the second PCR would have failed entirely, and T2 would again have not been created.

Another possibility in FIG. 3B is that the first TE-LSP T1 is computed, but not yet established, by the time the second PCR is received by the PCE. Because T1 has not yet reserved the bandwidth between nodes A-B and B-C, the PCE computes the same shortest path for the second PCR. The allocation of the same resource is known as "double booking" the available resource. Computation of TE-LSP T2 thus results in the same path as T1; however if T1 is established first and reserves the available bandwidth first (i.e., "wins" the race), attempts by node A to signal T2 fail, and the second PCR must again be sent to the PCE for a new path, thereby creating excess signaling overhead. The results of a serialized computation of paths are clearly a disadvantage to the second PCR in either of these scenarios.

Figure 3C:
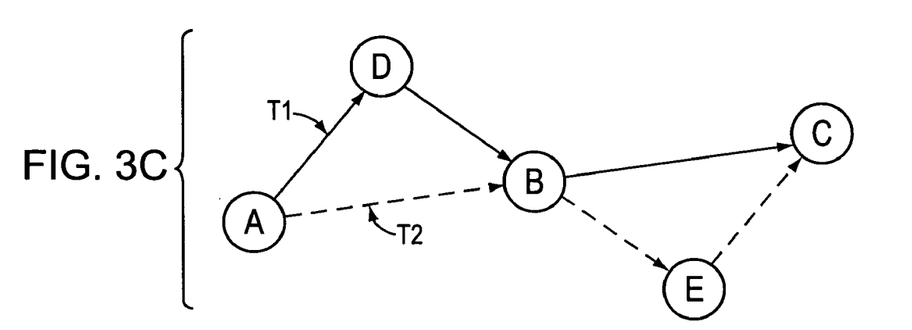
FIG. 3C is a schematic block diagram of exemplary paths computed in a packed fashion in accordance with the present invention.

FIG. 3C is a schematic block diagram of exemplary paths computed in a packed fashion in accordance with the present invention. Assume the same example as above, but now further assume that the two PCRs are packed in accordance with the present invention. By packing the two PCRs into a set, the PCE is able to compute the best paths for the set as a whole. For instance, rather than computing T1 with cost 2 and T2 with cost 11 as above, the packed computation may result in an equal distribution of costs, such as by computing T1 to traverse links A-D, D-B, and B-C (cost 7), and T2 to traverse links A-B, B-E, and E-C (cost 7). While the cost of Ti has increased, T2 has decreased, which may be especially important if T2 was constrained to a path with a cost of less than 10. As can be seen, packing PCRs creates a more globalized optimization and an increased probability that an available path will be found for a larger number of requests than if those requests were computed in an uncorrelated fashion. Notably, double booking of any resources has also been obviated by computing the paths for T1 and T2 in a correlated manner.

In the event, however, that no path was available to the second PCR other than by double booking (e.g., link A-B if links A-D and A-E were unavailable), the PCE may be configured to reject the second PCR knowing that it has allocated those resources to the first PCR. In this manner, double booking resources is avoided, and signaling overhead is reduced (i.e., no attempt is made to establish the TE-LSP that would inevitably fail). Notably, there may be circumstances where the PCE is configured to double book the resources anyway, such as where an LSR may not actually signal the resultant TE-LSP. Because of this, it may be inappropriate to reject any PCRs based on double booking where the double booked request (e.g., a second PCR) may have eventually been satisfied. Those skilled in the art will understand that this configuration results in a race condition, but that the condition is an acceptable one through configuration.

Notably, other methods for computing packed requests (through packing algorithms) for globalized optimization will be understood by those skilled in the art. The examples set forth herein are merely representative, and are not meant to be limiting on the scope of the present invention. For example, in addition to cost, other TE-LSP constraints may benefit from a correlated computation, such as, e.g., bandwidth. For instance, a first and second TE-LSP with small bandwidth constraints may be separately computed to traverse separate first and second links, thereby limiting the available bandwidth on both links to below what a third TE-LSP with larger bandwidth may require. Through correlated computation of the three TE-LSPs, however, the first and second smaller bandwidth TE-LSPs may be computed to traverse the first link in order to allow the larger bandwidth TE-LSP to traverse the second link.

Upon computing the paths, the PCE responds to the LSRs sending the PCRs with the computed paths for the set, such as through conventional PCE reply messages. Notably, the PCE may notify the LSRs that their requests have been packed with other PCRS, such as through a special flag or other indication in the reply message. This notification is advantageous because the TE-LSP may take a longer path than necessary because of such packing. For instance, as a consequence to global optimization described above, the TE-LSP takes a sub-optimal path to accommodate other TE-LSPs. However, those other TE-LSPs may not have been established (e.g., the LSRs selected a better path, or the other TE-LSPs fail for other reasons), so new opportunities are created that may result in a more optimal path. Moreover, the PCE may be configured to send this notification if the cost of the correlated computed path (within the set) exceeds the cost of the uncorrelated computed path (alone) for the TE-LSP by a certain amount (e.g., percentage). Those skilled in the art will understand that this determination, however, requires two separate path computations by the PCE.

Upon receiving the notification, the LSR may desire to send a subsequent PCR (e.g., for re-optimization of the resultant TE-LSP) sooner than if it had not been packed. This re-optimization PCR may be jittered (i.e., delayed for a randomly selected amount of time) so as not to create another burst of PCRs to the PCE from other LSRs receiving the same notification. Also, the LSR may choose not to signal (establish) the resultant TE-LSP in certain circumstances, such as where the LSR may choose a different path, e.g., when sending PCRs to separate domains to find the best path to a common destination.

The PCE packs the incoming PCRs into sets for a configurable period of time (e.g., a 30-min. packing timer) and repeats the packing algorithm as necessary. The packing timer may be configured to advantageously prevent cycling of the PCR packing algorithm (on/off/on/off/etc.), such as when the increased PCR rate fluctuates (increases and decreases frequently) during an event. After the expiration of the packing timer, the PCE may determine whether the PCR packing algorithm should continue by examining the current rate of incoming PCRs to the average rate, as described above. If the rate of incoming PCRs still indicates that the packing algorithm would be beneficial, the packing timer is restarted and the packing algorithm continues. Notably, the PCE may also utilize a dampening algorithm known to those skilled in the art (e.g., exponential dampening) to limit the frequency of the determination to continue the PCR packing algorithm, thereby extending the effective length of the packing timer. As an example, if after the 30 minute packing timer expires the PCE determines to restart the timer, it may be configured to wait twice as long (2*30 mins.=1 hour) before checking the rate of PCRs again. Once that check is performed, and the PCE again decides to continue the packing algorithm, it may do so for twice as long again (2*1 hour=2 hours), and so on (generally to a maximum configurable length), until the average PCR rate returns to normal.

Figure 4:
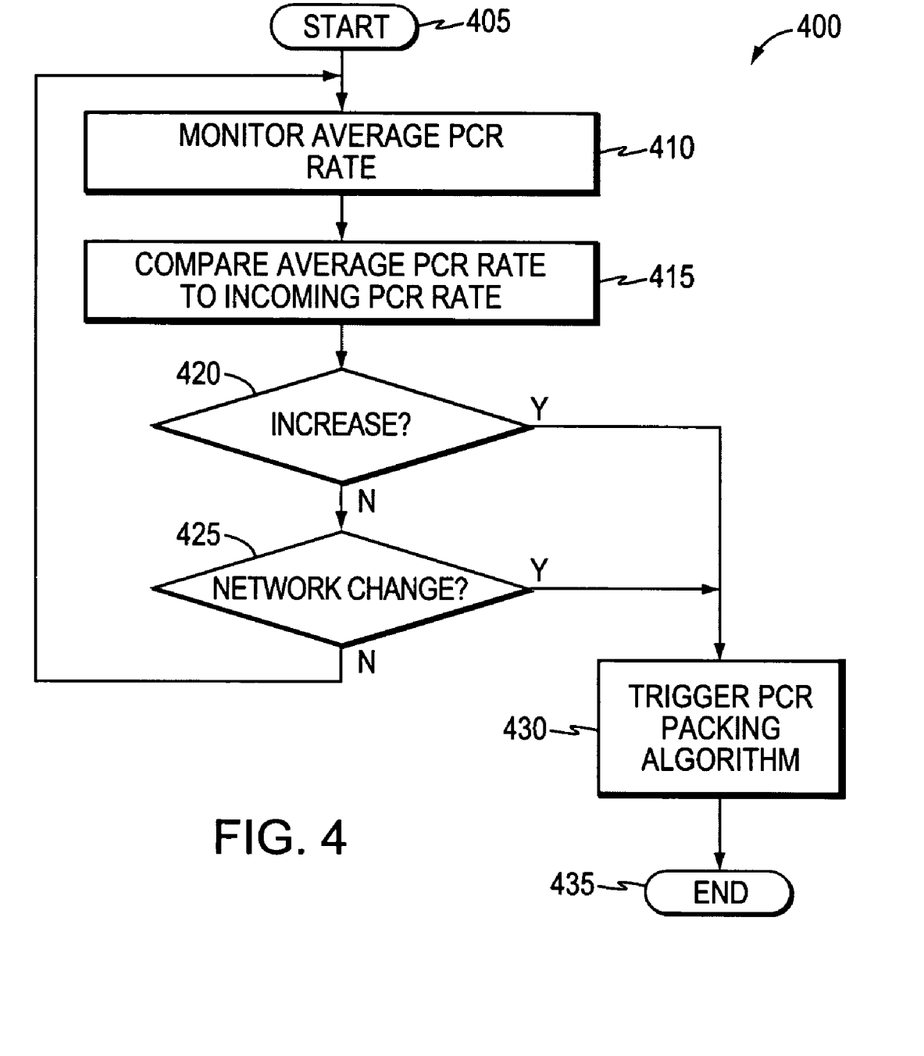
FIG. 4 is a flowchart illustrating a sequence of steps for triggering the PCR packing algorithm in accordance with the present invention.

FIG. 4 is a flowchart illustrating a sequence of steps for triggering the PCR packing algorithm in accordance with the present invention. Sequence 400 starts at step 405 and continues to step 410 where the PCE monitors the average rate of PCRs that it has been receiving, e.g., during steady state. At step 415, the PCE compares the average rate to the current incoming rate of PCRs, such as for any increase in received PCRs. If the PCE determines that there is no increase in the rate at which it receives PCRs in step 420, the PCE also determines in step 425 whether any network change has occurred that indicates a possible increase in the rate (e.g., a network element failure or restoration as notified through an IGP Advertisement). If no such change has occurred, the sequence repeats at step 410. In the event an increase in the received PCR rate increases in step 420 or a network change occurs in step 425, the PCE triggers the PCR packing algorithm in step 430. The sequence to trigger the packing algorithm ends at step 435.

Figure 5:
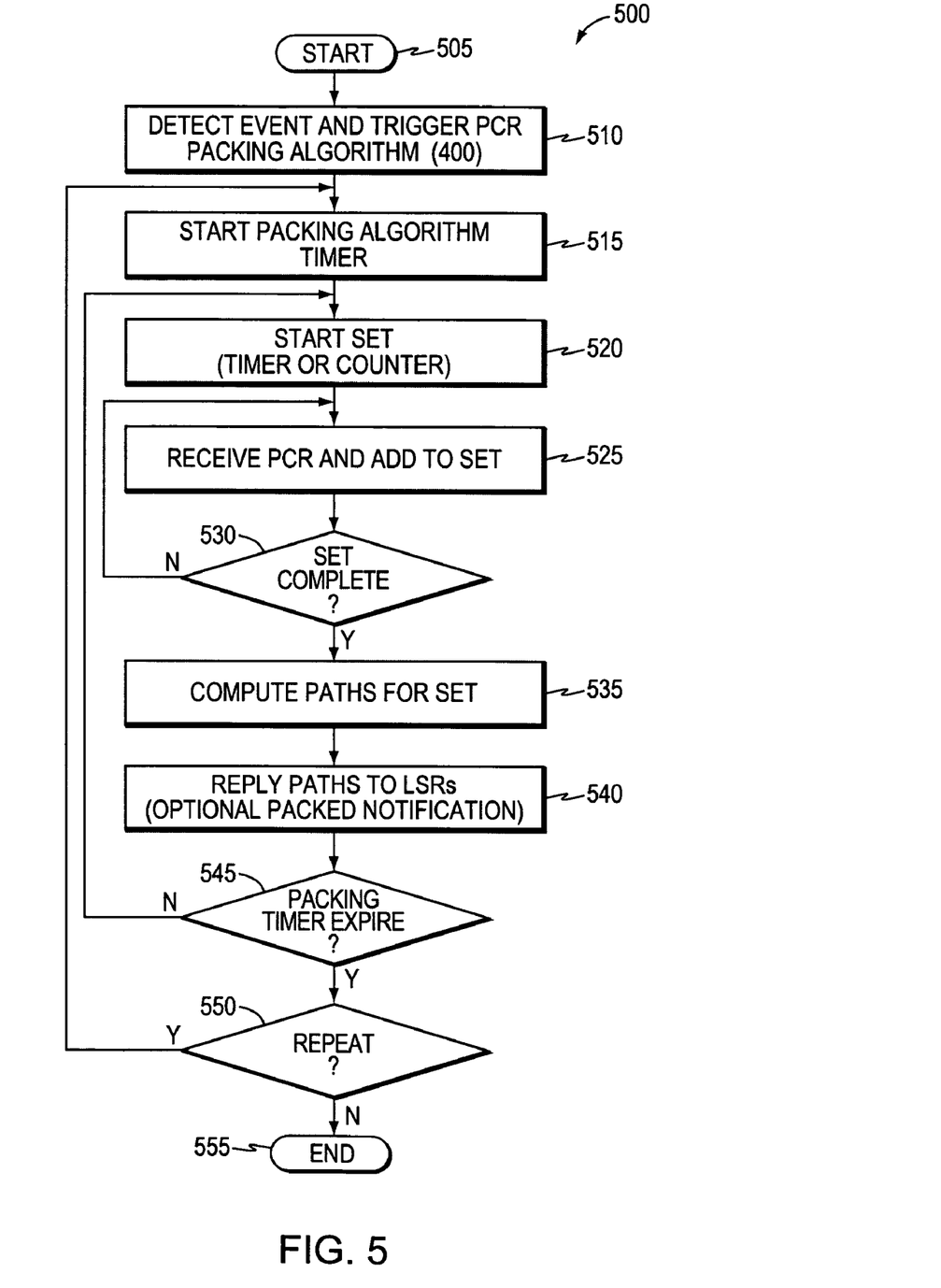
FIG. 5 is a flowchart illustrating a sequence of steps for packing PCRs in accordance with the present invention.

FIG. 5 is a flowchart illustrating a sequence of steps for packing PCRs in accordance with the present invention. Sequence 500 starts at step 505 and continues to step 510 where the PCE detects a network event and triggers the PCR packing algorithm, such as in sequence 400 described above. Once triggered, the PCE starts a packing algorithm timer (e.g., 30 mins.) at step 515 and a set at step 520, the latter by starting a set timer (e.g., 5 secs.) or a set counter (e.g., to zero). Upon receiving a PCR with the current set running, the PCE adds that PCR to the current set in step 525. If the set is not yet complete in step 530 (i.e., the timer has not yet expired or configurable number of PCRs not reached), the sequence continues to receive PCRs at step 525. Otherwise, once the set is complete (i.e., timer expires or number is reached) in step 535, the PCE computes paths for the entire set in step 535 in accordance with the methods of the present invention described herein. In step 540 the PCE replies to the senders of the PCRs (e.g., the LSRs) with the computed paths of the set. Optionally, as described above, the PCE may notify the LSR that the PCR has been packed with other PCRs in step 540, such as through a flag in the reply message. Upon replying with the paths to the LSRs, the PCE determines if the packing timer has expired in step 545. If the packing timer has not expired, the PCE starts a new set in step 520, and repeats the sequence for the new set. If, however, the packing timer has expired, the PCE determines if the packing algorithm needs to be repeated in step 550, and if so, repeats the sequence from step 515 where it starts a new packing algorithm timer. If the PCE determines that the packing algorithm need not be repeated, the sequence ends at step 555.

Advantageously, the novel technique packs PCRs received at a PCE based on a network event that indicates an increase in the rate at which the PCE receives the PCRs.

By packing the PCRs into sets for path computation in response to the event, the inventive technique provides a mechanism for efficiently reducing race conditions, signaling overhead, and set-up failures generally caused by a sudden increase of PCRs.

While there has been shown and described an illustrative embodiment that triggers the packing of PCRs for TE-LSPs, it is to be understood that various other adaptations and modifications may be made within the spirit and scope of the present invention. For example, while the above description describes the domain in terms of a single area/level, the invention may also be advantageously used with multiple areas/levels within an AS, or with multiple ASes under applicable circumstances. Also, while a centralized PCE architecture is shown in FIG. 1, the invention may also be advantageously used in a distributed PCE architecture, such as where a border router is configured as a PCE in communication with other PCEs of other domains. It should also be noted that the PCEs described herein may be either a stateless or stateful PCE, and that either embodiment may advantageously utilize the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for triggering packing of path computation requests (PCRs) for traffic engineering (TE) label switched paths (LSPs) sent from one or more label-switched routers (LSRs) to a path computation element (PCE) of a computer network, the method comprising:
   detecting an event in the network;
   in response to the event, packing the incoming PCRs into one or more configured-length sets; and
   computing paths for each PCR of a set while considering the other PCRs of that set,
   wherein the event indicates that an increase in the number of incoming PCRs has occurred.

2. The method as in claim 1, wherein the step of detecting further comprises:
   monitoring an average rate of receiving PCRs; and
   comparing the average rate with a new monitored rate of receiving PCRs to detect a configurable increase in the rate.

3. The method as in claim 1, further comprising:
   responding to the LSRs that sent the PCRs; and
   notifying the LSRs that their respective PCRs have been packed in a set of PCRs.

4. The method as in claim 1, further comprising: completing the packing of PCRs into sets after a configurable period of time.

5. The method as in claim 4, further comprising: determining whether the packing of PCRs is to be repeated for the configurable period of time.

6. The method as in claim 1, wherein computing determines paths for each PCR to provide a substantially equal distribution of costs among the PCRs of the set.

7. A method for triggering packing of path computation requests (PCRs) for traffic engineering (TE) label switched paths (LSPs) sent from one or more label-switched routers (LSRs) to a path computation element (PCE) of a computer network, the method comprising:
   detecting an event in the network;
   in response to the event, packing the incoming PCRs into one or more configured-length sets, wherein the packing packs PCRs into sets for a specified time interval; and
   computing paths for each PCR of a set while considering the other PCRs of that set.

8. The method as in claim 7, wherein the event indicates that a change in network topology has occurred.

9. A method for triggering packing of path computation requests (PCRs) for traffic engineering (TE) label switched paths (LSPs) sent from one or more label-switched routers (LSRs) to a path computation element (PCE) of a computer network, the method comprising:
   detecting an event in the network;
   in response to the event, packing the incoming PCRs into one or more configured-length sets, wherein the packing packs PCRs into sets for a certain number of PCRs; and
   computing paths for each PCR of a set while considering the other PCRs of that set.

10. A system for triggering packing of path computation requests (PCRs) for traffic engineering (TE) label switched paths (LSPs) of a computer network, the system comprising:
    one or more label-switched routers (LSRs) configured to send PCRs;
    a path computation element (PCE) to receive the PCRs, the PCE further configured to i) detect an event in the network, ii) in response to the event, pack the PCRs into one or more configured-length sets, and iii) compute paths for each PCR of a set while considering the other PCRs of that set; and
    a set timer, the set timer to define the configured-length of the packed PCR sets.

11. The system as in claim 10, wherein the event indicates that an increase in the number of incoming PCRs has occurred.

12. The system as in claim 10, wherein the event indicates that a change in network topology has occurred.

13. The system as in claim 10, wherein the PCE is further configured to, iv) monitor an average rate of receiving PCRs, and v) compare the average rate with a new monitored rate of receiving PCRs to detect a configurable increase in the rate.

14. The system as in claim 10, further comprising:
    a response sent from the PCE to one of the one or more LSRs that sent the PCRs; and
    a notification in the response that the PCR send by the one of the one or more LSRs has been packed in a set of PCRs.

15. The system as in claim 10, further comprising: a packing timer, the packing timer to define for how long the PCRs are to be packed into sets.

16. The system as in claim 10, wherein the PCE is further configured to determine paths for each PCR to provide a substantially equal distribution of costs among the PCRs of the set.

17. A system for triggering packing of path computation requests (PCRs) for traffic engineering (TE) label switched paths (LSPs) of a computer network, the system comprising:
    one or more label-switched routers (LSRs) configured to send PCRs;

a path computation element (PCE) to receive the PCRs, the PCE further configured to i) detect an event in the network, ii) in response to the event, pack the PCRs into one or more configured-length sets, and iii) compute paths for each PCR of a set while considering the other PCRs of that set; and a set counter, the set counter to define the configured-length of the packed PCR sets.

18. A node for triggering the packing of path computation requests (PCRs) for traffic engineering (TE) label switched paths (LSPs) that are sent from one or more label-switched routers (LSRs) to a path computation element (PCE) of a computer network, the node comprising:

a network interface to receive PCRs and notifications of events in the computer network;

a processor coupled to the network interface and configured to execute software processes; and a memory to store a path computation element (PCE) process executable by the processor, the PCE process configured to i) detect an event in the network, ii) in response to the event, pack the PCRs into one or more configured-length sets, and iii) compute paths for each PCR of a set while considering the other PCRs of that set, wherein the event indicates that an increase in the number of incoming PCRs has occurred.

19. A node for triggering the packing of path computation requests (PCRs) for traffic engineering (TE) label switched paths (LSPs) that are sent from one or more label-switched routers (LSRs) to a path computation element (PCE) of a computer network, the node comprising:

a network interface to receive PCRs and notifications of events in the computer network;

a processor coupled to the network interface and configured to execute software processes;

a memory to store a path computation element (PCE) process executable by the processor, the PCE process configured to i) detect an event in the network, ii) in response to the event, pack the PCRs into one or more configured-length sets, and iii) compute paths for each PCR of a set while considering the other PCRs of that set; and a set timer, the set timer to define the configured-length of the packed PCR sets.

20. A node for triggering the packing of path computation requests (PCRs) for traffic engineering (TE) label switched paths (LSPs) that are sent from one or more label-switched routers (LSRs) to a path computation element (PCE) of a computer network, the node comprising:

a network interface to receive PCRs and notifications of events in the computer network;

a processor coupled to the network interface and configured to execute software processes;

a memory to store a path computation element (PCE) process executable by the processor, the PCE process configured to i) detect an event in the network, ii) in response to the event, pack the PCRs into one or more configured-length sets, and iii) compute paths for each PCR of a set while considering the other PCRs of that set; and a set counter, the set counter to define the configured-length of the packed PCR sets.

21. The node as in claim 20, wherein the event indicates that a change in network topology has occurred.

22. The node as in claim 20, wherein the PCE process is further configured to monitor an average rate of receiving PCRs, and to compare the average rate with a new monitored rate of receiving PCRs to detect a configurable increase in the rate.

23. The node as in claim 20, further comprising:

a response sent from the PCE to one of the one or more LSRs that sent the PCRs; and a notification in the response that the PCR send by the one of the one or more LSRs has been packed in a set of PCRs.

24. The node as in claim 20, further comprising:

a packing timer, the packing timer to define for how long the PCRs are to be packed into sets.

25. The node as in claim 20, wherein the PCE process is further configured to determine paths for each PCR to provide a substantially equal distribution of costs among the PCRs of the set.

* * * * *

UNITED STATES PATENT AND TRADEMARK OFFICE
CERTIFICATE OF CORRECTION

PATENT NO. : 7,623,461 B2  Page 1 of 1
APPLICATION NO. : 11/054145
DATED : November 24, 2009
INVENTOR(S) : Jean-Philippe Vasseur It is certified that error appears in the above-identified patent and that said Letters Patent is hereby corrected as shown below:

Col. 5, Line 67, please amend as shown:
  ing packing of path computation requests (PCRS)(PCRs) for traffic Col. 6, Line 21, please amend as shown:
  number of incoming PCRS PCRs. The PCE monitors the average Col. 6, Line 34, please amend as shown:
  number of LSRs to request new/reoptimized new/re-optimized TE-LSPs at Col. 6, Line 55, please amend as shown:
  in the rate at which the PCE receives the PCRS PCRs. By packing Col. 9, Line 9, please amend as shown:
  establishes LSPs that have guaranteed [[s]] bandwidth under Col. 9, Line 57, please amend as shown:
  number of incoming PCRS PCRs. The PCE monitors the average

Col. 11, Line 22, please amend as shown:
  number of LSRs to request new/reoptimizednew/re-optimized TE-LSPs at Col. 12, Line 56, please amend as shown:
  links A-B, B-E, and E-C (cost 7). While the cost of [[Ti]] T1 has Col. 13, Line 34, please amend as shown:
  with other PCRS PCRs, such as through a special flag or other Signed and Sealed this Twenty-second Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,623,461 B2 Page 1 of 1
APPLICATION NO. : 11/054145
DATED : November 24, 2009
INVENTOR(S) : Vasseur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Fourteenth Day of December, 2010

David J. Kappos
*Director of the United States Patent and Trademark Office*